United States Patent [19]
Nelson

[11] 3,739,526
[45] June 19, 1973

[54] UP AND OVER DOOR MOUNT

[76] Inventor: George E. Nelson, 201 Mountain Avenue, North Caldwell, N.J. 07006

[22] Filed: May 26, 1971

[21] Appl. No.: 146,909

[52] U.S. Cl.......................... 49/197, 49/397, 220/38
[51] Int. Cl............................................. E05d 15/38
[58] Field of Search ................. 49/197, 397; 220/38

[56] References Cited
UNITED STATES PATENTS
| | | | |
|---|---|---|---|
| 443,350 | 12/1890 | Berners................................. | 49/197 |
| 3,525,177 | 8/1970 | Robinson.......................... | 49/397 X |

Primary Examiner—Kenneth Downey
Attorney—George H. Mortimer

[57] ABSTRACT

An up and over door mount particularly for a frame for equipment such as a motor generator set, a refrigeration unit and the like for transport equipment including vehicles such as refrigerated trailers and containers used in the trucking and shipping industry. It includes a suitably supported upstanding projection or door support rail, e.g., an angle iron constituting part of the frame for the equipment and having one arm vertical and the other horizontal at the bottom of the vertical arm. The door comprises a panel of suitable material such as reinforced plastic in which the reinforcement can be expanded metal, glass fibers, and the like which has a rearward projection along the upper end thereof and, preferably, a forwardly extending projection on the lower portion of the door. The rearward projection rests on the upstanding projection when the door is in the closed or normal upright position and retaining means located in front of and above said upstanding projection a distance at least equal to the thickness of the door are provided to prevent the door from being moved off the upstanding projection while permitting it to be swung from vertical to horizontal position and then moved bodily inwardly, i.e., over the top. The distance of inward travel of the door is preferably restricted, e.g., by engagement of the forward projection with the retaining means. In this position the door is out of the way so that free access to the interior of the frame is provided. Preferably guide rails are provided in the frame to guide the door during its inward motion so that it does not become canted. The framework may provide one or more access openings to be covered by such up and over doors and the completed frame may be suitably mounted on a vehicle or container, e.g., by suspension from the underside of the chassis or floor of the vehicle or by resting on the upper side of the floor, depending upon circumstances and the structure of the vehicle or container. Suitable means to secure the frame to the vehicle body or chassis may be provided so as to leave a storage space for the door between the frame and the part of the vehicle where the frame is suspended. Where the frame rests upon the floor of the vehicle a top wall is secured to the frame a sufficient distance above the door support rail to protect the equipment within the frame from dust, dirt, water, etc. and to provide the door storage space beneath it.

12 Claims, 7 Drawing Figures

PATENTED JUN 19 1973 3,739,526

INVENTOR.
GEORGE E. NELSON
BY George H. Mortimer
ATTORNEY

INVENTOR.
GEORGE E. NELSON
BY George H. Mortimer
ATTORNEY

UP AND OVER DOOR MOUNT

INTRODUCTION

The present invention relates to an up and over door mount. It is particularly useful in combination with a frame for a motor-generator set and for refrigeration units for vehicles and containers such as refrigerated trailers and containers used in the trucking and shipping industry.

BACKGROUND OF THE INVENTION

Vehicles and containers for transport of perishable goods are known which are provided with refrigeration units for keeping the temperature inside the vehicle or container at a safe level to preserve the contents during shipping. In general the refrigeration equipment includes an electric motor and suitable controls to turn the unit on when the temperature rises to a predetermined maximum and to shut it off when the temperature has fallen to a predetermined minimum. During transit on land the electric power for the electric motor and controls is generally supplied by an accompanying motor-generator set. The most common motor used is an internal combustion engine, e.g., a diesel engine. The refrigeration and motor generator units have been mounted in many different positions on the vehicle. One common position on trailers for both motor-generator sets and refrigeration units is in front of the rear axle beneath the floor of the vehicle by suspending them from the floor structure or chassis thereof. Another common position for refrigeration units or containers is in a recess at the front where the motor-generator set may also be mounted out where the container is carried by a truck or trailer from which the container is lifted bodily for transport by ship which supplies power for the refrigerator motor and controls. It is common to mount the motor-generator set on the frame or chassis of the truck or trailer. As those familiar with land transport know, a trailer has rear wheels and means at the front removably to connect the trailer to a tractor. In this type of vehicle it is common to provide means at the front that can be raised and lowered to hold the vehicle in horizontal position when the cab is disconnected and to move out of the way for travel when connected to the tractor.

In widely used types of such undermounted refrigeration units and motor-generator sets the framework has included one or two access openings closed by doors hinged along a vertical edge and removably held in closed position by a latch. These doors have been made of metal that has been painted to protect against the corrosive environment to which these units are subjected. There have been two serious problems in connection with such units. One is that when the access door is opened it stands at right angles to the vehicle and takes up considerable space which is at a premium when it is parked either on board a ship, at dock side, or in a parking area where space is limited. Another disadvantage is that with the vibration to which these units are subjected as the vehicles travel the highways the latches become loose so that the doors swing open, break off and fall on highways where they create an unsightly and sometimes dangerous condition. a further disadvantage is that these doors, despite the paint or other protective coating still corrode and have to be replaced at considerable expense from time to time.

SUMMARY OF THE INVENTION

The up and over door mount of the present invention overcomes the aforementioned disadvantages of the door mounts of refrigeration units and motor-generator sets of the prior art and by utilizing doors made of reinforced plastic material, which is made possible by suspending the door, the deterioration of the doors is avoided because the plastics are not subject to corrosion in the unfavorable environment to which these units are subjected. The up and over mount for these doors provides a simple, effective, durable and attractive closure for such units and sets which permits access to the interior thereof when the door is in the up and over position with little if any projection of the door beyond the vertical plane through the vehicle wall above the unit.

BRIEF DESCRIPTION OF THE DRAWING

The invention will be described in connection with illustrations of certain embodiments thereof shown in the drawings in which.

DESCRIPTION OF THE PREFERRED EMBODIMENTS

The up and over door mount of the invention is simple in construction requiring only a suitably supported upstanding projection or door support rail, a door having a rearward projection along the upper end thereof adapted to rest on said upstanding projection when the door is in the closed position and retaining means to hold the door on its support rail or the upstanding projection in the closed position to permit the door to be moved from vertical to horizontal position and then moved bodily into a door storage space along the upper edge of the upstanding projection. The retaining means for the door is thus located in front of and above the upper edge of the door support rail or upstanding projection a distance at least equal to the thickness of the door. Preferably the upstanding projection is part of the framework for supporting and housing the refrigeration unit, the motor-generator set, and the like, and advantageously can be simply an angle iron having one arm thereof vertical and the other arm thereof horizontal at the bottom of the vertical arm. This provides an upstanding projection having a height at least equal to the thickness or width of the rearward projection and a thickness that is only a small fraction thereof whereby the door may be pivoted from the suspended vertical position to the horizontal position around the upper edge of the door support rail, e.g., the angle iron, with the rearward projection moving behind the upright arm and permitting the door in the horizontal position to be moved inwardly any desired distance. It is preferable to provide guides in the framework to prevent the door from canting as it is moved into the door storage space and also to provide the door with a forward projection adjacent to the lower portion thereof to serve a number of functions, including a handle for the door, a reinforcement for it, a latch check and a stop or means to limit the inward movement of the door into the storage space.

The door preferably is made of suitably reinforced plastic panels which are relatively light in weight, resistant to the corrosive influences of the environment to which the unit is subjected in use, sound deadening so that vibration as the unit is moved with the vehicle does not cause objectionable noise even if the latch mechanism are not tight, yet it has adequate strength and durability and is comparably low in cost.

Figure 1:
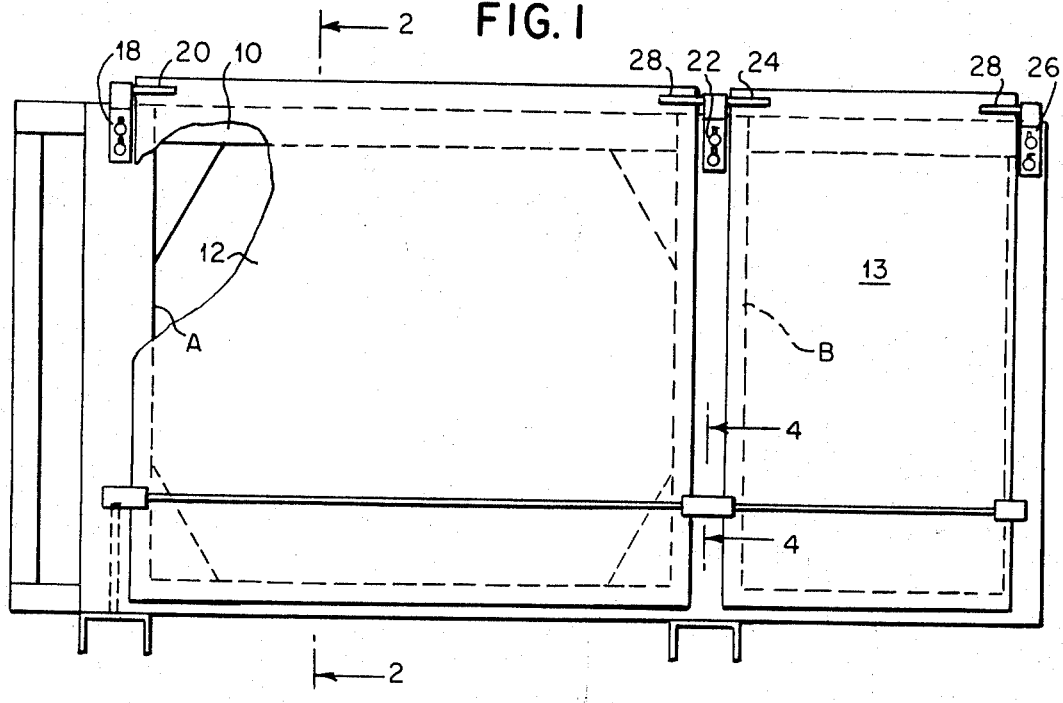
FIG. 1 is a side view of a frame suitable for suspension beneath a vehicle which has two access openings covered by doors embodying the invention.
Figure 2:
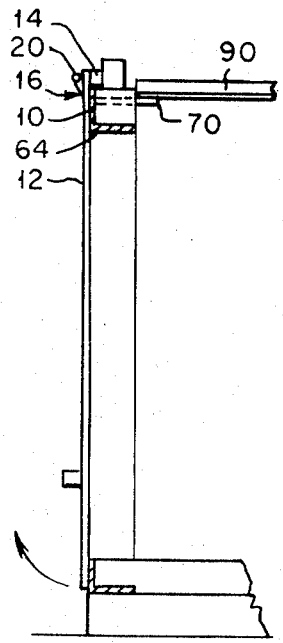
FIG. 2 is a fragmentary vertical sectional view along the line 2—2 of FIG. 1 looking in the direction of the arrows.

Referring now more particularly to FIGS. 1 and 2, the upstanding projection or door support rail 10 supports a door 12 in vertical position by means of a rearward projection 14 along the upper end thereof which rests on rail 10 where it is held by retaining means 16. As illustrated in FIGS. 1 and 2, the retaining means at the left side of the door as viewed in FIG. 1 comprises a bracket 18 adapted to be bolted to a frame member soon to be described which carries at the upper end thereof a rod or bar 20 which may be welded or otherwise suitably secured to the bracket. This bar, as viewed in FIG. 1, extends to the right of the bracket so as to overlie a portion of the door. A similar retaining means is provided at the right side of the door, as viewed in FIG. 1, again in the form of a bracket 22 having a bar 24 secured by welding or the like to the upper end thereof.

In the embodiment of the invention illustrated in FIG. 1, the framework, soon to be described, comprises two access openings A and B. Openings A and B are closed by doors 12 and 13, respectively, which have the same structure so that the description of door 12 applies also to door 13. It is convenient to provide the bracket 22 with a bar 24 of sufficient length that it extends both to right and left, as clearly seen in FIG. 1, so as to overlie a portion of both doors 12 and 13. A third bracket 26 is provided at the right of the frame as seen in FIG. 1 which has a bar or rod 28 welded or otherwise suitably secured thereto and extending to the left so as to overlie a portion of door 13.

Referring to FIG. 2 it will be seen that the location of the rod 20 is in front of the upstanding projection 10 by a distance substantially equal to the thickness of the door 12. Similarly the bar 20 is located above the upper edge of the upstanding projection 10 by a distance substantially equal to the thickness of the door. This permits the door to be moved in the direction of the arrow at the bottom of FIG. 2 from the suspended vertical position in which the door closes the access opening to a horizontal position around the upper edge of the upstanding projection 10 as a pivot. As the door moves from vertical to horizontal the rearward projection 14 moves behind the upstanding projection 10 which has a height greater than the width of the projection 14 but a thickness which is only a fraction of that width. When the door is horizontal it can be moved inwardly, i.e., to the right as viewed in FIG. 2, any desired distance. In general it is desired to limit the extent of this horizontal movement and for this purpose a forward projection 30 adjacent to the lower portion of door 12 is provided which extends substantially the full width of the door and which engages bars 20 and 24 at a predetermined position of the door within the storage space of the frame. Both the rearward projection 14 and the forward projection 30 serve to strengthen and reinforce the panel material out of which the door is constructed.

The door 12 may be made of any suitable sheet or panel material including sheet metal, plywood, press wood and the like but a preferred material is reinforced plastic sheets. One suitable plastic sheet has a thickness of about one-eighth inch and is reinforced with expanded metal that has been flattened so as to be completely covered on both sides by the plastic in which the expanded metal is embedded. Such plastic sheet material is readily available on the market in large sheets from which a number of doors can be cut out. Using this type of material the rearward projection 14 and the forward projection 30 can be provided by fastening plastic bar stock with adhesive or the like and suitable fasteners such as screws, bolts and the like (not shown) to the indicated positions on the panel material.

Another satisfactory plastic material is fiberglass reinforced plastic sheets which can either be fabricated into doors as described or molded initially into doors having the forward and rearward projections integral therewith In either case the door is rectangular and is of substantially uniform thickness throughout the major portion of its area, i.e., except where such projections are secured to or formed as part of it.

Figure 5:
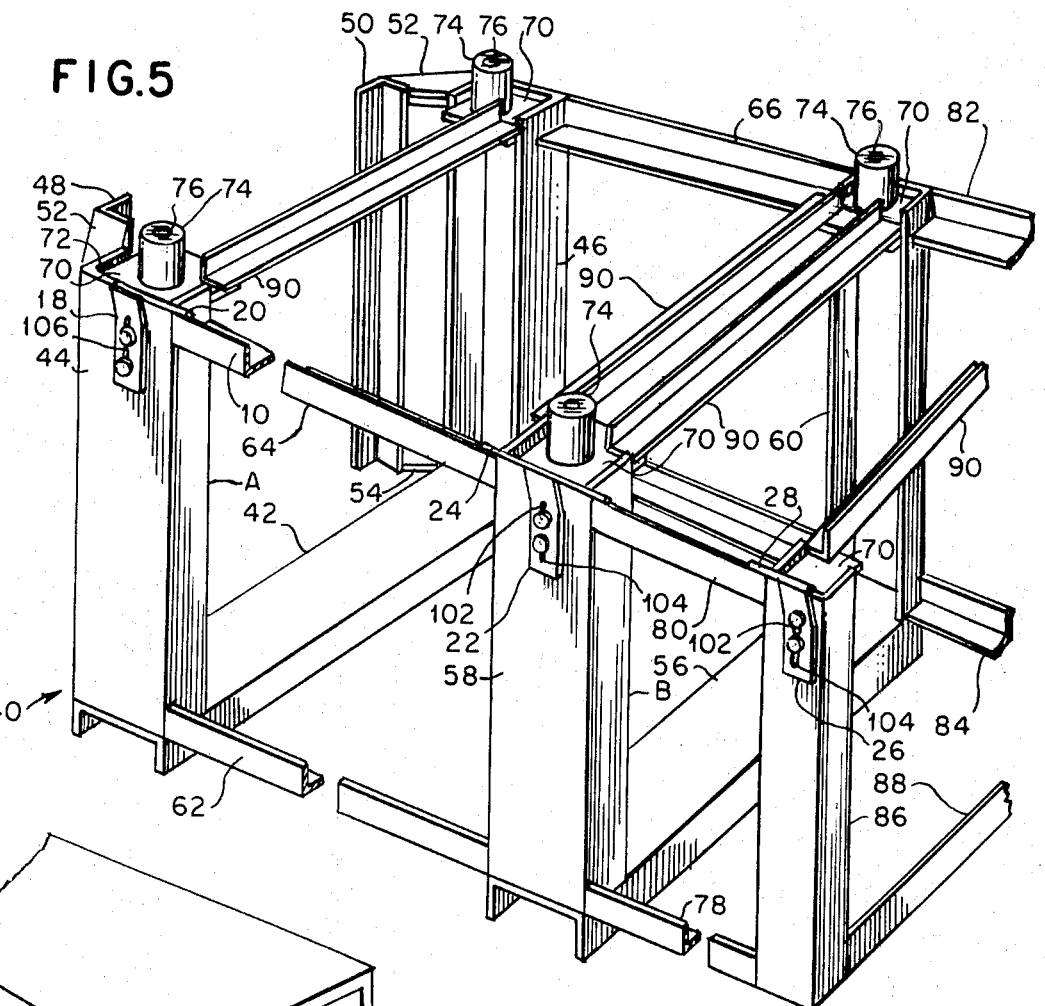
FIG. 5 is an isometric view of the framework of the embodiment shown in FIG. 1.

Referring now more particularly to FIG. 5, the frame 40 is particularly designed for a motor-generator set utilizing an internal combustion engine, e.g., a diesel engine, as the prime mover. Such a prime mover weighs several hundred pounds and requires a substantial frame to house and support it. Such a frame may comprise a foundation member 42, preferably a channel iron having the web at the top and the flangers extending downwardly, as shown in the drawing. Welded or otherwise suitably secured to foundation member 42 is a front upright bar 44 and a rear upright bar 46 which preferably are made of channel iron like the support member 42.

In use the diesel engine is suitably bolted directly to the support member 42 with the connection to the generator on the right end thereof. Such internal combustion engine motors are frequently liquid cooled which requires a radiator for the cooling liquid. But air cooled motors may be used if desired. In the frame shown in FIG. 5 provision is made to mount a radiator which comprises two vertical angle irons 48 and 50 secured, respectively, to uprights 44 and 46 by short lengths of angle iron 52 at the top and similar short lengths of angle iron 54 at the bottom which are welded or otherwise suitably secured to the respective angle irons and the uprights. The radiator (not shown) is suitably bolted or otherwise fastened to the angle irons 48 and 50.

A second support member 56 is also provided at a proper distance from support member 42 to which the generator can be suitably bolted or otherwise fastened and it is provided with upright bars 58 and 60 which are suitably welded to 56 in the same manner that 44 and 46 are secured to 42.

The two U-shaped equipment support members, one comprising bars 42, 44 and 46 and the other bars 56, 58 and 60, can be held in suitably spaced relation by angle irons 62, 64, 66 and 68 which are welded or otherwise suitably secured at their ends to the upright bars 44, 46, 58 and 60 as shown in FIG. 5. As seen, angle iron 62 is flush with the front of upright bars 44 and 58 and the bottom surface of the bar is aligned with the upper surface of horizontal bars 42 and 56. Angle iron 68 is similarly secured to the lower ends of bars 46 and 60. This provides a space under them for the prongs of a fork lift truck which can be used to move the frame from place to place and to support it while it is being secured in position on the container or vehicle.

Angle iron 64 is welded to the upper ends of upright bars 44 and 58 so that the front surfaces are flush and so that the horizontal arm is at the bottom, whereby the vertical arm of this angle iron serves as the door support rail 10. The angle iron 66 is similarly secured to the upper ends of upright channel irons 46 and 60 with the exposed side flush with the webs thereof.

Suitable means are provided for securing the equipment support members to the part of the vehicle from which it is to be suspended. A suitable means is to provide a plate 70 having a length equal to the distance between the flanges of the upright channel irons 44, 46, 58 and 60 and a width somewhat greater than the depth of the flanges for a purpose soon to be described. These plates are suitably welded in the channel irons as shown in FIG. 5, preferably somewhat recessed below the end of the channel iron to provide for build up of weld metal as shown at 72 at the upper end of channel member 44.

Above each plate 70 is a spacer 74 of sufficient height to provide a door storage space above angle iron 64 when the frame is fastened to the vehicle, for example, to its floor structure. Generally speaking the floor structure of a vehicle comprises a plurality of floor joists, e.g., I-beams on which a metal plate or the like rests and constitutes the floor of the vehicle. Each spacer 74 can be provided with the bore 76 aligning with a similar bore in the respective plate 70. A bolt (not shown) can be passed from the underside of the plate 70 through the bore 76, spacer 74 and through a corresponding hole in the supporting structure of the vehicle. A suitable washer and lock nuts (not shown) are provided to hold the framework securely to the vehicle.

A motor-generator set of the type referred to requires auxiliary equipment, including storage batteries and control equipment. For this purpose the frame is extended to the right by means of horizontal angle irons 78, 80, 82 and 84, corner vertical angle irons 86 and a similar one, not shown, at the rear, and a horizontal angle iron 88 at the bottom.

The bars 44, 64, 58 and 62 constitute the access opening A and the bars 58, 80, 86 and 78 constitute the access opening B into the interior of the framework. It is not essential to provide frame members running from side to side, i.e., between uprights 44 and 46 and 58 and 60, respectively, at the top of the framework but it is preferred to provide guide means for the door to prevent it from canting as it is moved inwardly over the frame after it has been raised to horizontal position, as described above. Suitable door guides comprise relatively lighter weight angle irons 90 which have the horizontal arm secured, e.g., welded, at each end to the respective plates 70 on the respective uprights. The vertical arm of the angle iron 90 extends upwardly far enough to serve as a guide for the door and the horizontal arm may extend inwardly far enough to serve as a horizontal guide or rest for the door as it is moved horizontally over the framework.

Figure 4:
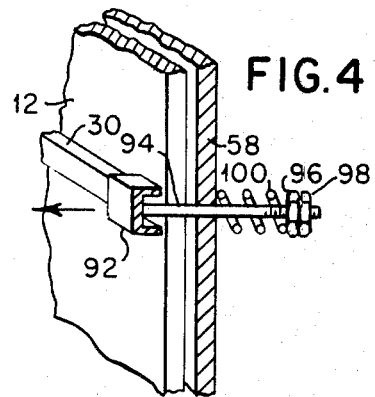
FIG. 4 is a fragmentary isometric vertical sectional view along the line 4—4 of FIG. 1 looking in the direction of the arrows.

It is preferable to provide means for holding the doors tightly against the frame of the access openings when the unit is secured to a vehicle for travel. A suitable latch mechanism is illustrated in FIG. 4 which comprises a length of channel iron 92 having a distance between the flanges slightly greater than the width of forward projection 30 on the door 12 and a length sufficient to extend an inch or so over the door in horizontal position but be clear of the door in vertical position. Secured to the web of the angle iron 92 is a bolt 94 which passes through a suitable bore in the web 58. A suitable lock nut or a pair of lock nuts 96 and 98 are threaded onto the end of the bolt 94 with a compression spring 100 between them and the web 58. Looking at FIG. 4 it will be seen that by grasping the channel iron 92 between the thumb and the finger, pulling it to the left and rotating it 90° so that it lies beyond the edge of the door 12, the door can be moved without interference past the latch. To latch the door the reverse procedure is followed. This simple latch biases the door yieldingly to closed position at all times when it is engaged as shown in FIG. 4. Similar latches are provided at each side of the doors and the one in the center, as seen in FIG. 1, can hold the adjacent edges of both doors in closed position as described.

The brackets 18, 22 and 26 may be secured to the framework in any desired manner. A preferred securing means includes vertical slots 102 and 104, as seen in the brackets 22 and 26 in FIG. 5, through which bolts 106, as seen on bracket 18, can be passed into tapped bores in the webs of the uprights. This gives a degree of adjustability in the location of the retaining rod when bolts 106 are turned down tight as shown in FIG. 5 for bracket 18. The upper part of the bracket is bent at an angle outwardly so as to space the retaining bars 20, 24 and 28 a suitable distance in front of the upright projection 10. Lock washers may be used, if desired, to prevent the bolts 106 from loosening by vibration as the framework travels over the highway.

Figure 6:
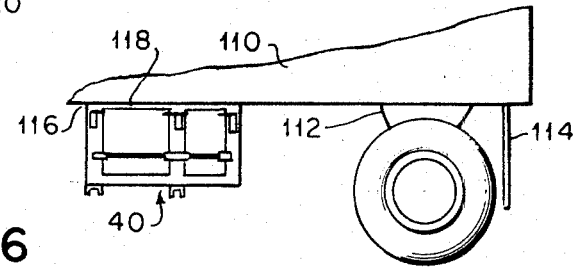
FIG. 6 is a fragmentary side elevation of a trailer having the unit of FIG. 1 suspended from the floor structure thereof.

Referring now to FIG. 6, a trailer 110 is illustrated diagrammatically and fragmentarily in vertical elevation and comprises a wheel assembly 112, a mud guard 114 and a floor structure 116 to which the frame 40 is suitably secured, e.g., in the manner previously described, by suspending it from the floor structure or from special structure provided on the vehicle for this purpose. Spacers 74, not shown in FIG. 6, hold the framework away from the floor structure or other special suspending means of the trailer sufficiently to provide a door storage space 118 above the angle iron 64.

Figure 7:
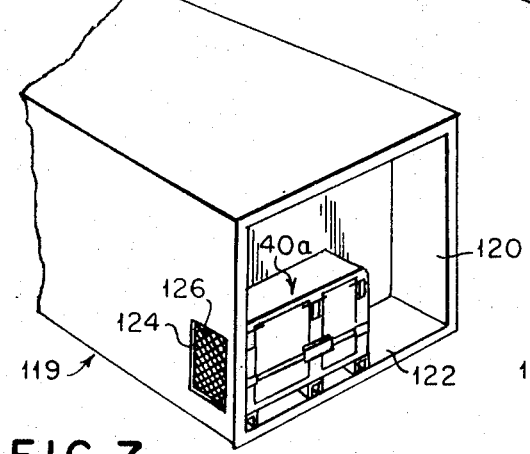
FIG. 7 is a fragmentary isometric view of a trailer or container from the front showing an equipment recess with a motor generator unit embodying the invention supported on the floor within the recess.

FIG. 7 illustrates diagrammatically and fragmentarily a different type of mounting which is suitable for trailers and containers that may be lifted bodily from a vehicle chassis. The body is designated 119 and it has a recess 120 in the front wall for holding equipment used in refrigerating it. The recess includes a floor structure 122 on which a unit 40a rests and may be suitably secured in place thereon. In some cases a fuel tank is mounted in such a recess and unit 40a can be secured on top of such a fuel tank, if desired. This unit 40a may be similar to that shown in FIG. 5 but it is not necessary that the upright frame members be as large and strong as in the form shown in FIG. 6 where the unit is suspended. The details of the framework, in either case, are not part of the invention per se since any persons of ordinary skill in this art can readily design a frame member of adequate strength. Moreover in this form of the invention the radiator for the internal combustion engine can be at the right or the left end but it is preferred to have the radiator adjacent to the end next to the upright wall in which an opening 124 is provided that may be covered with a suitable grill 126.

Figure 3:
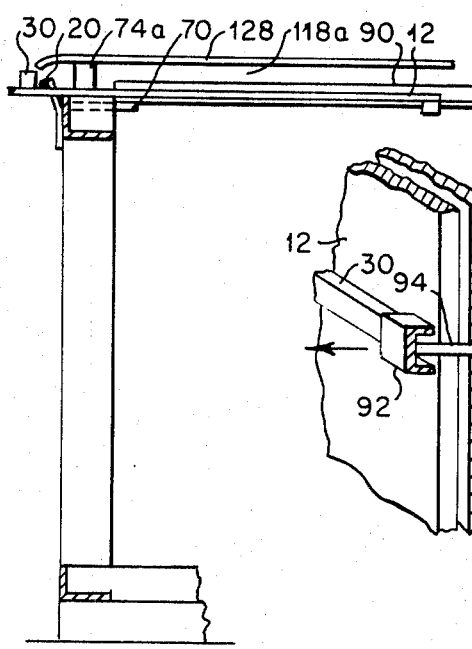
FIG. 3 is a fragmentary vertical sectional view similar to FIG. 2 but of a different embodiment of frame adapted to be supported on the floor of a vehicle and having the door in the up and over position.

In the embodiment of the invention shown in FIG. 7 it is desirable to provide the frame with a top wall or cover so as to prevent ingress of dust, dirt, water and the like to the mechanism housed within the framework. Referring to FIG. 3 a suitable cover is shown at 128 which rests on spacer blocks 74a to which the cover place may be bolted or otherwise suitably secured. The top cover may be made of metal, plastic, plywood and the like as may be desired. Beneath the cover in this embodiment is door storage space 118a.

While the invention has been described in detail herein above with reference to two specific embodiments of the invention, those skilled in the art will recognize that modifications and variations may be made within the principles of the invention which have been set forth herein above.

Having thus described and illustrated the invention, what is claimed is:

1. An up and over door mount comprising a frame having an access opening comprising an upright at each side thereof and a top member having a horizontal flange connecting said uprights across the top thereof, an upstanding projection supported on said frame having an upper door supporting edge above said horizontal flange, a door having a rearward projection along the upper end thereof adapted to rest on said upstanding projection and support said door in its vertical position with its upper end above said upstanding projection a distance greater than the thickness of said door, and retaining means for said door in the form of a bracket secured to said frame at each side of said opening having a transversely extending rod secured thereto which extends over at least part of said door and which is located in front of and above said upstanding projection a distance at least and approximately equal to the thickness of said door whereby said door is held on said upstanding projection but can be swung upwardly from vertical position around said upstanding projection as a pivot to a horizontal position inside and under said rod and then be slid horizontally inwardly over said opening.

2. An up and over door mount comprising a frame adapted to contain equipment having an access opening for inspection and/or servicing said equipment, said access opening being framed by an upright at each side and a top member having a horizontal flange connecting said uprights across the top thereof, an upstanding projection supported on said frame having an upper door supporting edge above said horizontal flange at the top of said access opening, a door for closing said access opening having a rearward projection along the upper end thereof adapted to rest on said upstanding projection and support said door in its vertical position with its upper end above said upstanding projection a distance greater than the thickness of said door, and retaining means for said door in the form of a bracket secured to said frame at each side of said opening having a transversely extending rod secured thereto which extends over at least part of said door and which is located in front of and above said upstanding projection a distance at least and approximately equal to the thickness of said door whereby said door is held on said upstanding projection but can be swung upwardly from vertical position around said upstanding projection as a pivot to a horizontal position inside and under said rod and then be slid horizontally inwardly over said opening.

3. An up and over door mount as set forth in claim 2 in which said door is rectangular and of substantially uniform thickness throughout the major portion of its area, said rearward projection is parallel to said upper end thereof, and said upstanding projection extends across said access opening and has a height at least equal to and a thickness only a small fraction of the width of said rearward projection whereby the door may be pivoted from vertical to horizontal position around the upper edge of said upstanding projection with the rearward projection moving behind the upstanding projection and permitting said door in the horizontal position to be moved over said frame.

4. An up and over door mount as set forth in claim 3 in which said frame is provided with means to guide the horizontal movement of said door.

5. An up and over door mount as set forth in claim 4 in which said door is provided with a forward projection adjacent to the lower portion thereof to limit inward horizontal movement thereof by contact with said retaining means.

6. A vehicle under mount comprising:
A. a frame having upright members adapted to be bolted to the under surface of a vehicle and horizontal members connecting said upright members at top and bottom and therewith forming an access opening, said upper horizontal member including a horizontal flange;
B. means adapted to space said upright members from the under surface of said vehicle to provide a door storage space;
C. an upstanding projection supported on said frame having an upper door supporting edge above said horizontal flange extending across said access opening;
D. a door adapted to close said access opening having a rearward projection along its upper end adapted to rest on said upstanding projection and support the door in vertical position with its upper end above said upstanding projection a distance greater than the thickness of said door, said upstanding projection having a height at least equal to and a thickness only a small fraction of the width of said rearward projection; and
E. retaining means for said door in the form of a bracket secured to said frame at each side of said opening having a transversely extending rod secured thereto which extends over at least part of said door and which is located in front of and above said upstanding projection a distance at least and approximately equal to the thickness of said door whereby said door is held on said upstanding projection but can be swung from vertical to horizontal position around the upper edge of said upstanding projection as a pivot with said rearward projection moving behind said upstanding projection and said door than being movable bodily into said storage space.

7. A vehicle under mount as set forth in claim 6 in which said door has a forward projection on the lower portion thereof to serve as a stop means to limit movement of the door into said storage space by contact with said retaining means.

8. A vehicle under mount comprising:
A. a frame having:
   i. a pair of spaced equipment support members having a horizontal bar and upright bars at each end thereof;
   ii. means at the upper end of each upright bar adapted to be bolted to the under surface of a vehicle;
   iii. horizontal spacer bars connecting the upper and lower ends of said upright bars and providing an access opening at the front, said upper horizontal spacer bar including a horizontal flange; and
   iv. door guide rails secured to the upper ends of said respective upright bars of each support member;
B. an upstanding projection supported on said frame having an upper door supporting edge above the horizontal flange on said upper spacer bar above said access opening;
C. means adapted to space said upstanding projection and said door guide rails from the supporting structure of said vehicle to provide a door storage space;
D. a door adapted in its vertical position to close said access opening having a rearward projection at the top thereof adapted to rest on said upstanding projection and support the door with its upper end above said upstanding projection a distance greater than the thickness of said door, said upstanding projection having a height at least equal to and a thickness only a small fraction of the width of said upstanding projection; and
E. a retainer for said door in the form of a bracket secured to said frame and having rod means extending over said door in front of and above said upstanding projection a distance at least and approximately equal to the thickness of said door whereby said door is held on said upstanding projection but can be swung upwardly from vertical position around said upstanding projection as a pivot to a horizontal position inside and under said rod and then be slid horizontally inwardly over said opening.

9. A vehicle under mount as set forth in claim 8 in which said door is a reinforced plastic panel.

10. A vehicle under mount as set forth in claim 9 in which said panel is reinforced by expanded metal.

11. A vehicle under mount as set forth in claim 8 in which said door is molded fiberglass reinforced plastic.

12. A vehicle under mount comprising:
A. a frame providing a plurality of access openings in a side thereof, each access opening having side uprights, a bottom rail and a top rail having a horizontal flange;
B. an upstanding projection supported in said frame having an upper door supporting edge above said horizontal flange and in the plane of the side of said frame above said access openings;
C. a door for each access opening, each door comprising a sheet of reinforced plastic material covering its access opening when in vertical position and having a rearward projection along the top thereof adapted to rest on said upstanding projection and suspend the door therefrom with its upper end above said upstanding projection a distance greater than the thickness of said door, said upstanding projection having a height at least equal to and a thickness only a small fraction of the width of said rearward projection; and
D. a bracket secured to said frame at each side of each access opening having rod-like retaining means above and in front of said upstanding projection a distance at least and approximately equal to the thickness of said door and extending over at least a portion of said door to keep the rearward projection thereof on said upstanding projection when the door is hanging in vertical position, whereby the bottom of said door may be swung outwardly and upwardly around the upper edge of said upstanding projection from vertical to horizontal position with said rearward projection moving behind said upstanding projection and the entire door may be moved horizontally inwardly along the upper edge of said upstanding projection.

* * * * *